US012576937B2

(12) United States Patent
Nishiyabu et al.

(10) Patent No.: US 12,576,937 B2
(45) Date of Patent: Mar. 17, 2026

(54) HYBRID STRADDLE VEHICLE

(71) Applicant: KAWASAKI MOTORS, LTD., Akashi (JP)

(72) Inventors: Masaki Nishiyabu, Akashi (JP); Ryosuke Ohori, Akashi (JP); Takuya Noami, Akashi (JP); Tetsuji Yamamoto, Akashi (JP)

(73) Assignee: KAWASAKI MOTORS, LTD., Akashi (JP)

( * ) Notice: Subject to any disclaimer, the term of this patent is extended or adjusted under 35 U.S.C. 154(b) by 436 days.

(21) Appl. No.: 17/821,361

(22) Filed: Aug. 22, 2022

(65) Prior Publication Data

US 2023/0060450 A1    Mar. 2, 2023

(30) Foreign Application Priority Data

Sep. 1, 2021    (JP) ................................. 2021-142677

(51) Int. Cl.
B62K 11/04        (2006.01)
B62J 41/00        (2020.01)

(52) U.S. Cl.
CPC ............... B62K 11/04 (2013.01); B62J 41/00 (2020.02); *B62K 2204/00* (2013.01)

(58) Field of Classification Search
CPC ...................................................... B62J 41/00
See application file for complete search history.

(56) References Cited

U.S. PATENT DOCUMENTS

| | | | | | |
|---|---|---|---|---|---|
| 4,019,595 | A | * | 4/1977 | Imai ......................... | B62J 17/10 |
| | | | | | 165/51 |
| 4,632,206 | A | * | 12/1986 | Morinaka ................. | B62J 17/02 |
| | | | | | 165/41 |
| 5,715,904 | A | * | 2/1998 | Takahashi ............... | F02B 61/02 |
| | | | | | 180/68.1 |
| 2015/0007731 | A1 | * | 1/2015 | Shinoda ............. | B01D 53/0462 |
| | | | | | 96/111 |
| 2016/0311311 | A1 | * | 10/2016 | Choi .................... | F28D 1/05325 |
| 2017/0166043 | A1 | * | 6/2017 | Yun ......................... | B60K 11/06 |
| 2018/0093734 | A1 | * | 4/2018 | Matsuo .................. | B60K 11/04 |
| 2021/0001943 | A1 | * | 1/2021 | Ikeda ..................... | B62K 11/02 |
| 2021/0348543 | A1 | | 11/2021 | Sakamoto et al. | |
| 2021/0354552 | A1 | * | 11/2021 | Jeong ..................... | B60K 11/02 |
| 2021/0363911 | A1 | * | 11/2021 | Kim .......................... | F01P 3/18 |

(Continued)

FOREIGN PATENT DOCUMENTS

| | | |
|---|---|---|
| EP | 3950484 A1 | 2/2022 |
| JP | 2006144703 A | 6/2006 |

(Continued)

*Primary Examiner* — Erez Gurari
(74) *Attorney, Agent, or Firm* — Alleman Hall & Tuttle LLP

(57) ABSTRACT

A hybrid straddle vehicle includes: an internal combustion engine; an electric motor that generates power to be transmitted to a driving wheel; an inverter that controls electric power to be supplied to the electric motor; a first radiator that cools the internal combustion engine; and a second radiator that cools at least one cooling target selected from the group consisting of the electric motor and the inverter, at least a part of the second radiator overlapping the first radiator when viewed from a vehicle front side, the second radiator being located in front of the first radiator.

16 Claims, 6 Drawing Sheets

(56)          References Cited

U.S. PATENT DOCUMENTS

| 2022/0032764 | A1  |    | 2/2022  | Kaneko et al. |
|---|---|---|---|---|
| 2023/0060450 | A1 | * | 3/2023  | Nishiyabu ................ B62M 7/04 |
| 2023/0166805 | A1 | * | 6/2023  | Jin .......................... B62J 41/00 |
|  |  |  |  | 180/220 |
| 2023/0173875 | A1 | * | 6/2023  | Durbecq ................... F01P 5/06 |
|  |  |  |  | 62/89 |
| 2023/0256792 | A1 | * | 8/2023  | Durbecq ........... B60H 1/32281 |
|  |  |  |  | 62/244 |
| 2023/0417161 | A1 | * | 12/2023 | Ozeki ...................... B62J 41/00 |
| 2024/0042830 | A1 | * | 2/2024  | Mammeri .......... B60H 1/00564 |
| 2024/0253453 | A1 | * | 8/2024  | Mammeri ............... F01P 11/10 |

FOREIGN PATENT DOCUMENTS

| JP | 2010100124 | A  | 5/2010 |
|---|---|---|---|
| JP | 3159814 | U  | 6/2010 |
| JP | 2020032958 | A  | 3/2020 |
| WO | 2020213590 | A1 | 10/2020 |

* cited by examiner

HYBRID STRADDLE VEHICLE

CROSS-REFERENCE TO RELATED APPLICATION

This application claims priority to and the benefit of Japanese Patent Application No. 2021-142677 filed on Sep. 1, 2021, the entire disclosure of which is incorporated herein by reference.

BACKGROUND OF THE INVENTION

Field of the Invention

The present disclosure relates to a hybrid straddle vehicle including an internal combustion engine and an electric motor.

Description of the Related Art

International Publication 2020/213590 discloses a series hybrid straddle vehicle including: an engine radiator that cools an electric power generation engine; and a motor radiator that cools a motor unit.

However, since an occupied space occupied by the engine radiator and the motor radiator is large, the degree of freedom of the arrangement of the other parts deteriorates in the straddle vehicle whose vehicle size is limited. When the sizes of the radiators are reduced to reduce the occupied space occupied by the radiators, cooling efficiency deteriorates.

SUMMARY OF THE INVENTION

An object of the present disclosure is to realize both the reduction of the occupied space and the improvement of the cooling efficiency in the hybrid straddle vehicle.

A hybrid straddle vehicle according to one aspect of the present disclosure includes: an internal combustion engine; an electric motor that generates power to be transmitted to a driving wheel; an inverter that controls electric power to be supplied to the electric motor; a first radiator that cools the internal combustion engine; and a second radiator that cools at least one cooling target selected from the group consisting of the electric motor and the inverter, at least a part of the second radiator overlapping the first radiator when viewed from a vehicle front side, the second radiator being located in front of the first radiator.

DESCRIPTION OF THE PREFERRED EMBODIMENTS

Hereinafter, an embodiment will be described with reference to the drawings. Directions stated in the following description are based on directions from the viewpoint of a rider who rides a vehicle. To be specific, a traveling direction of the vehicle is a front direction, and a direction opposite to the traveling direction is a rear direction. A vehicle width direction is a left-right direction.

Figure 1:
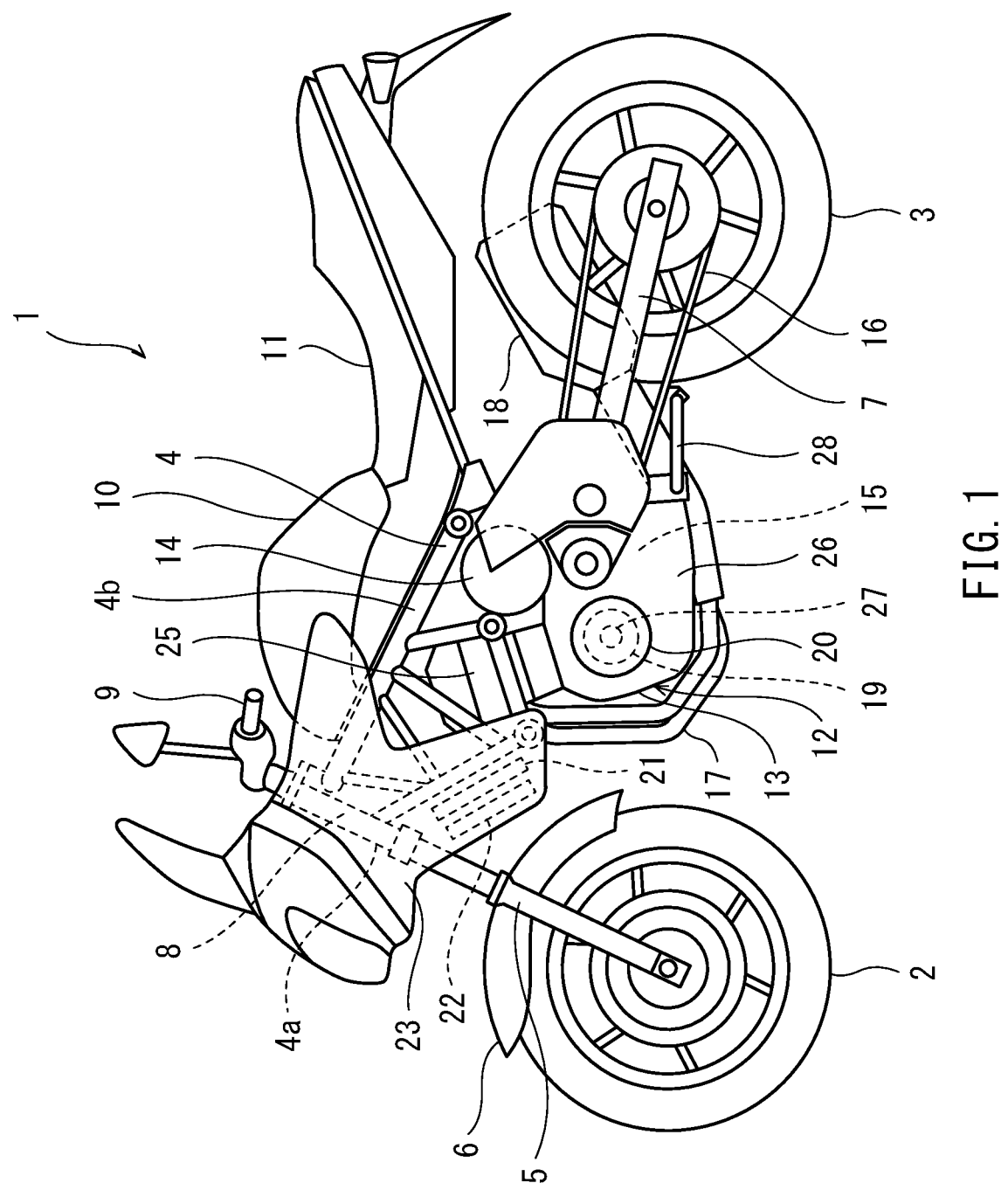
FIG. 1 is a left side view of a hybrid straddle vehicle according to an embodiment.

FIG. 1 is a left side view of a hybrid straddle vehicle 1 according to the embodiment. As shown in FIG. 1, one example of the hybrid straddle vehicle 1 is a motorcycle. However, the hybrid straddle the vehicle 1 may be any vehicle (for example, a three-wheeled vehicle) as long as it is a vehicle straddled by a rider. The vehicle 1 is a parallel hybrid vehicle. The vehicle 1 includes a front wheel 2, a rear wheel 3, and a vehicle body frame 4. The front wheel 2 in in connection with a front portion of the vehicle body frame 4 through a pair of left and right front forks 5. The front wheel 2 is covered with a front fender 6 from above. The rear wheel 3 is in connection with the vehicle body frame 4 through a swing arm 7.

The vehicle body frame 4 includes: a head pipe 4a in which a steering shaft 8 is so as to be rotatable; and a main frame 4b extending in the rear direction from the head pipe 4a. The front forks 5 are coupled to the steering shaft 8 through a bracket. A handle 9 grasped with hands of the rider is in connection with the steering shaft 8. A fuel tank 10 is located behind the handle 9. A seat 11 on which the rider is seated is located behind the fuel tank 10. A power unit 12 is located on the vehicle body frame 4 and between the front wheel 2 and the rear wheel 3. The power unit 12 is a driving power source that drives a driving wheel.

The power unit 12 includes an internal combustion engine 13 and an electric motor unit 14. The internal combustion engine 13 and the electric motor unit 14 serve as a prime mover that generates power to be transmitted to the rear wheel 3. The internal combustion engine 13 is a two cylinder engine, but the number of cylinders may be a number other than two. The internal combustion engine 13 includes a cylinder 25, a crank case 26, and a crank shaft 27. The cylinder 25 houses a piston. The cylinder 25 defines a combustion chamber together with the piston. The crank shaft 27 is in connection with the piston. The cylinder 25 includes an intake port 25a (see FIG. 7) and an exhaust port 25b (see FIG. 6). The crank case 26 is located under the cylinder 25 and houses the crank shaft 27.

The crank case 26 houses a transmission 15 in addition to the crank shaft 27. The transmission 15 is located behind the crank shaft 27. One end portion of the crank shaft 27 is in connection with the transmission 15 so as to be able to transmit power to the transmission 15. An output shaft of the transmission 15 is in connection with the rear wheel 3 through a power transmitting structure 16, such as a chain or a belt. Driving power output from the internal combustion engine 13 is transmitted to the rear wheel 3 through the transmission 15 and the power transmitting structure 16. A side stand 28 is attached to the vehicle body frame 4 so as to be turnable. The side stand 28 may turn and contact ground so as to project from the vehicle body frame 4 toward a lower-left side. When the vehicle 1 is parked by using the side stand 28, the vehicle 1 is inclined toward a left side.

The crank case 26 extends in the rear direction beyond the cylinder 25. The electric motor unit 14 is located behind the cylinder 25 and on an upper surface of the crank case 26. The electric motor unit 14 is in connection with the transmission 15 so as to be able to transmit power to the transmission 15. Driving power output from the electric motor unit 14 is transmitted to the rear wheel 3 through the transmission 15 and the power transmitting structure 16.

An exhaust pipe 17 which guides an exhaust gas generated by the combustion in the cylinder 25 is in connection with the exhaust port 25*b* (see FIG. 6) of the internal combustion engine 13. The exhaust pipe 17 extends from the exhaust port 25*b* of the cylinder 25 in the front direction and the lower direction, extends under the crank case 26 in the rear direction, and is in connection with a silencing muffler 18 located at a right side of the rear wheel 3.

The other end portion of the crank shaft 27 is in connection with a starter generator 19 so as to be able to transmit power to the starter generator 19. The starter generator 19 is one example of a component connected to the crank shaft 27. The starter generator 19 is located coaxially with the crank shaft 27. The starter generator 19 drives the crank shaft 27 to start the internal combustion engine 13 and is driven by the crank shaft 27 during the operation of the internal combustion engine 13 to generate electric power. The starter generator 19 is covered with a cover 20 detachably fixed to a left side surface of the crank case 26 by a fixture.

A first radiator 21 and a second radiator 22 are located in front of the internal combustion engine 13. A cooling target cooled by the first radiator 21 is the internal combustion engine 13. A cooling target cooled by the second radiator 22 is the electric motor unit 14. The first radiator 21 and the second radiator 22 are covered with a front cowl 23, supported by the vehicle body frame 4, from the vehicle left-right direction. The second radiator 22 is located in front of the first radiator 21. The second radiator 22 is located behind the front fork 5. Each of the first radiator 21 and the second radiator 22 is in such an inclined posture that an upper end thereof is located at a vehicle front side of a lower end thereof.

When the vehicle is in a stop state, the lower end of the second radiator 22 is located higher than a lower end of the front fender 6. The lower end of the second radiator 22 is located higher than the crank case 26. When the vehicle is in a stop state, the lower end of the second radiator 22 is located lower than an upper end of the front fender 6. The upper end of the second radiator 22 is located lower than the head pipe 4*a*. When the vehicle is in a stop state, the upper end of the second radiator 22 is located higher than an upper end of the front wheel 2. A height range of the second radiator 22 overlaps a height range of the cylinder 25. The lower end of the second radiator 22 is located lower than an upper end of the cylinder 25. The upper end of the second radiator 22 is located higher than a lower end of the cylinder 25.

Figure 2:
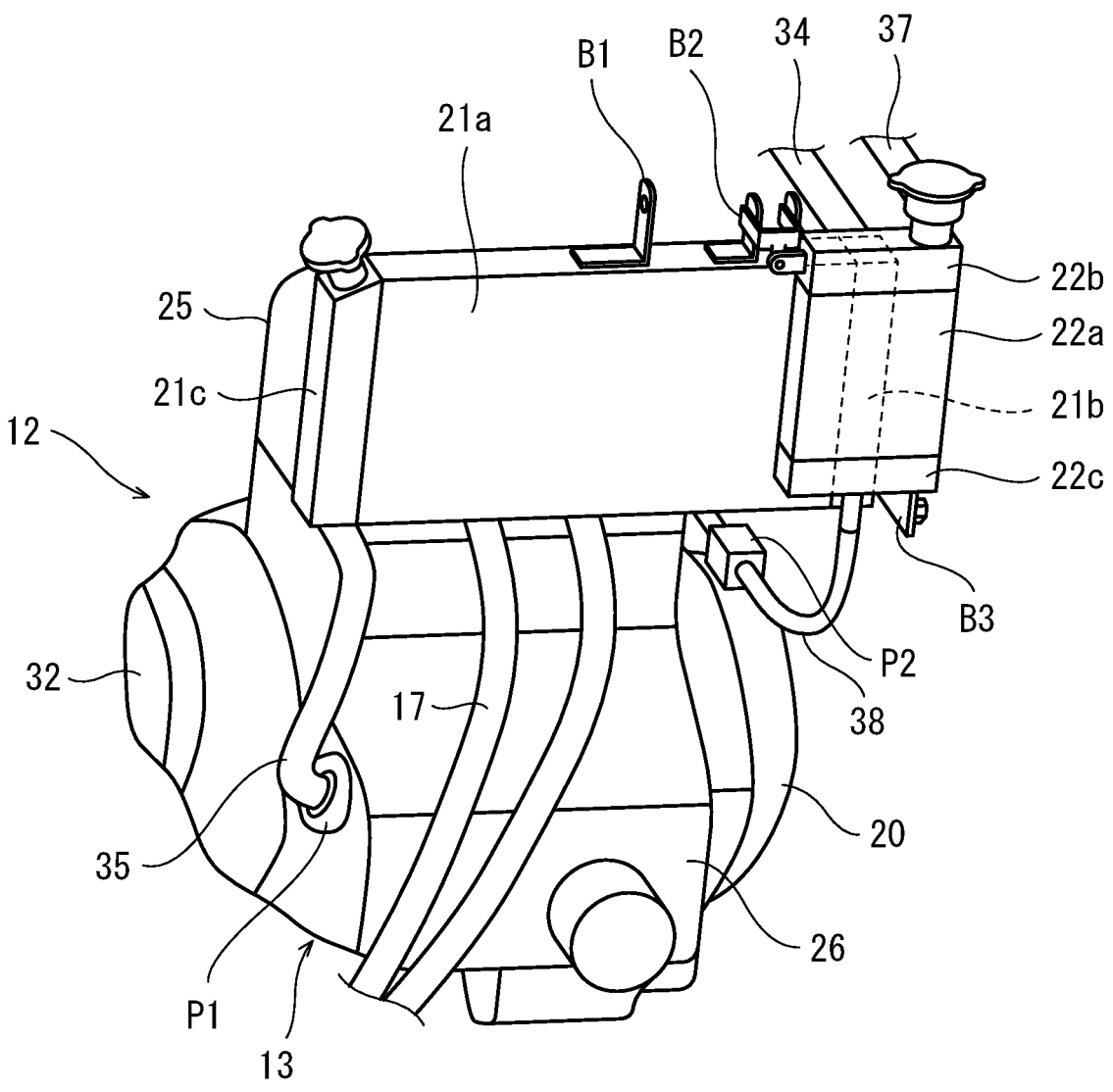
FIG. 2 is a perspective view when a power unit, a first radiator, and a second radiator shown in FIG. 1 are viewed from a vehicle front-right side.

FIG. 2 is a perspective view when the power unit 12, the first radiator 21, and the second radiator 22 shown in FIG. 1 are viewed from a vehicle front-right side. As shown in FIG. 2, a frontal projected area of the second radiator 22 is smaller than a frontal projected area of the first radiator 21. For example, the frontal projected area of the second radiator 22 is smaller than 50% of the frontal projected area of the first radiator 21 and larger than 10% of the frontal projected area of the first radiator 21. More specifically, the frontal projected area of the second radiator 22 may be larger than 20% of the frontal projected area of the first radiator 21 and smaller than 40% of the frontal projected area of the first radiator 21.

The second radiator 22 overlaps the first radiator 21 when viewed from the vehicle front side. The second radiator 22 is located at one side of a left-right direction center of the first radiator 21 in the left-right direction. In the present embodiment, the second radiator 22 is located at the vehicle left side (right side in FIG. 2) of the left-right direction center of the first radiator 21. The second radiator 22 is located at the left side of a left-right direction center of the vehicle 1, i.e., a side where the side stand 28 (see FIG. 1) exists.

The first radiator 21 includes a first heat exchanger 21*a*, a first inlet tank 21*b*, and a first outlet tank 21*c*. The first heat exchanger 21*a* includes: cooling liquid tubes connecting the first inlet tank 21*b* to the first outlet tank 21*c*; and radiating fins located on outer surfaces of the cooling liquid tubes. To be specific, when air flows through the first heat exchanger 21*a* from the front side to a rear side, heat of the cooling liquid in the cooling liquid tubes is released through the radiating fins to the air, and thus, the cooling liquid in the cooling liquid tubes is cooled. Each of the first inlet tank 21*b* and the first outlet tank 21*c* defines a storage space that communicates with passages in the cooling liquid tubes of the first heat exchanger 21*a*.

An outer shape of the entire first radiator 21 is a plate shape. A normal line orthogonal to a traveling wind receiving surface that is a main surface of the first radiator 21 is directed in the front direction. The first inlet tank 21*b* is adjacently located at the left side (right side in FIG. 2) of the first heat exchanger 21*a*. The first outlet tank 21*c* is adjacently located at the right side (left side in FIG. 2) of the first heat exchanger 21*a*. The first radiator 21 is directed such that a dimension of the first radiator 21 in the left-right direction is larger than a dimension of the first radiator 21 in the upper-lower direction.

The second radiator 22 includes a second heat exchanger 22*a*, a second inlet tank 22*b*, and a second outlet tank 22*c*. The second heat exchanger 22*a* includes: cooling liquid tubes connecting the second inlet tank 22*b* to the second outlet tank 22*c*; and radiating fins located on outer surfaces of the cooling liquid tubes. To be specific, when air flows through the second heat exchanger 22*a* from the front side to the rear side, heat of the cooling liquid in the cooling liquid tubes is released through the radiating fins to the air, and thus, the cooling liquid in the cooling liquid tubes is cooled. Each of the second inlet tank 22*b* and the second outlet tank 22*c* defines a storage space that communicates with passages in the cooling liquid tubes of the second heat exchanger 22*a*.

An outer shape of the entire second radiator 22 is a plate shape. A normal line orthogonal to a traveling wind receiving surface that is a main surface of the second radiator 22 is directed in the front direction. The second inlet tank 22*b* is adjacently located at an upper side of the second heat exchanger 22*a*. The second outlet tank 22*c* is adjacently located at a lower side of the second heat exchanger 22*a*. The second radiator 22 is directed such that a dimension of the second radiator 22 in the upper-lower direction is larger than a dimension of the second radiator 22 in the left-right direction.

The exhaust pipe 17 extends toward one side of the left-right direction center of the vehicle 1 in the left-right direction. Specifically, the exhaust pipe 17 extends toward the right side of the left-right direction center of the vehicle 1 so as to be in connection with the silencing muffler 18 (see FIG. 1) located at the right side of the rear wheel 3. The exhaust pipe 17 passes through a space right under a right half portion of the crank case 26. The exhaust pipe 17 extends toward one side (right side) of the left-right direction center of the vehicle 1 in the left-right direction, and the second radiator 22 is located at the other side (left side) of the left-right direction center of the vehicle 1 in the left-right direction. As a result, the second radiator 22 is located away from the exhaust pipe 17 in the left-right direction when viewed from a vehicle upper side.

A first inlet tube 34 is in connection with the first inlet tank 21*b* of the first radiator 21. The first inlet tube 34 guides to the first inlet tank 21*b* the cooling liquid which has cooled the cylinder 25 to be increased in temperature. A first outlet tube 35 is in connection with the first outlet tank 21*c* of the first radiator 21. The first outlet tube 35 guides to a first pump P1 the cooling liquid which has been cooled by the first radiator 21.

The first pump P1 is a mechanical pump that mechanically operates in association with the crank shaft 27 of the internal combustion engine 13. The first pump P1 is located on a right side surface of the internal combustion engine 13. The first pump P1 injects the cooling liquid into a cooling passage in the internal combustion engine 13. A cover 32 detachably fixed to a right side surface of the crank case 26 is located behind the first pump P1. The cover 32 covers, from the right side, a clutch indirectly connected to the crank shaft 27 (see FIG. 1) of the internal combustion engine 13.

A second inlet tube 37 is in connection with the second inlet tank 22*b* of the second radiator 22. The second inlet tube 37 guides to the second inlet tank 22*b* the cooling liquid which has cooled the electric motor unit 14 (see FIG. 1) to be increased in temperature. A second outlet tube 38 is in connection with the second outlet tank 22*c* of the second radiator 22. The second outlet tube 38 guides to a second pump P2 the cooling liquid which has been cooled by the second radiator 22.

The second pump P2 is driven irrespective of the crank shaft 27 of the internal combustion engine 13. For example, the second pump P2 is an electric pump that is electrically driven. The second pump P2 is fixed to the cover 20 detachably fixed to a left side surface of the crank case 26. The cover 20 covers the starter generator 19 (see FIG. 1) that is coaxial with the crank shaft 27. The second pump P2 is located lower than the second radiator 22.

The second inlet tube 37 passes through above the first radiator 21 in the front-rear direction. The second outlet tube 38 passes through under the first radiator 21 in the front-rear direction. At least one of the second inlet tube 37 or the second outlet tube 38 passes through right above the first radiator 21 in the front-rear direction.

Figure 3:
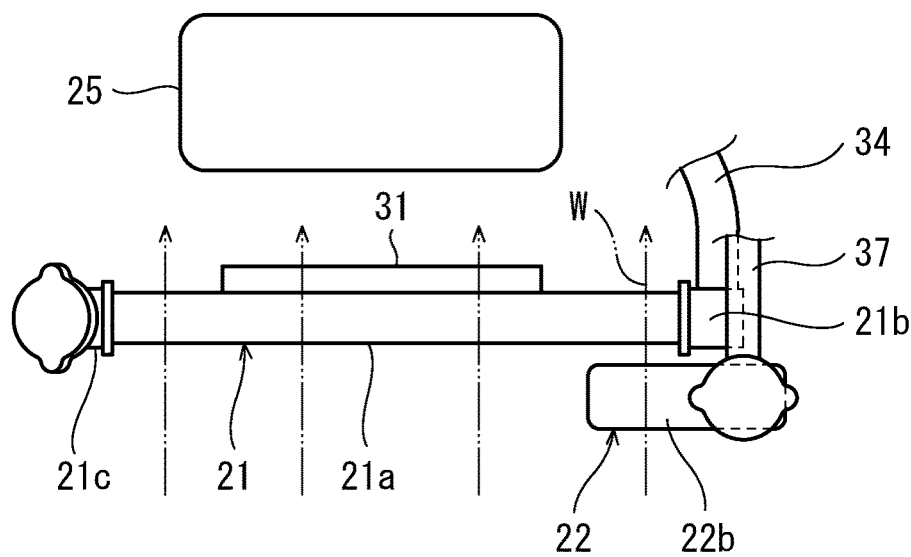
FIG. 3 is a plan view when the first radiator and the second radiator shown in FIG. 2 are viewed from a vehicle upper side.

FIG. 3 is a plan view when the first radiator 21 and the second radiator 22 shown in FIG. 2 are viewed from the vehicle upper side. As shown in FIG. 3, a radiator fan 31 is adjacent to the first radiator 21 in the front-rear direction. In the present embodiment, the radiator fan 31 is attached to the first radiator 21 so as to be located behind the first heat exchanger 21*a* of the first radiator 21. When the internal combustion engine 13 is operating, and the vehicle 1 is in a stop state, the radiator fan 31 is driven by electric power to generate the flow of the air flowing through the first heat exchanger 21*a* from the front side to the rear side. While the vehicle 1 is traveling, the radiator fan 31 stops, and the traveling wind flows through the first heat exchanger 21*a* from the front side to the rear side.

The cylinder 25 of the internal combustion engine 13 is located behind the first radiator 21 and the radiator fan 31.

In the present embodiment, a dimension of the first radiator 21 in the left-right direction is larger than a dimension of the cylinder 25 in the left-right direction. The first radiator 21 projects toward both sides in the left-right direction beyond the cylinder 25. The second radiator 22 is located outside the cylinder 25 in the left-right direction. The second heat exchanger 22*a* (see FIG. 2) of the second radiator 22 is located in front of and away from the first radiator 21. The second radiator 22 is directly opposed to the first radiator 21 in the front-rear direction. A maximum distance in the front-rear direction between the second heat exchanger 22*a* (see FIG. 2) of the second radiator 22 and the first inlet tank 21*b* of the first radiator 21 is 10 mm or more and 80 mm or less, preferably 20 mm or more and 50 mm or less. With this, while preventing the increase of an occupied space, the traveling wind flowing from the second radiator 22 toward the rear side avoids the first inlet tank 21*b* and is smoothly discharged.

At least a part W of the traveling wind having flowed through the second heat exchanger 22*a* (see FIG. 2) of the second radiator 22 from the front side to the rear side flows through the first heat exchanger 21*a* of the first radiator 21 from the front side to the rear side. The temperature of the cooling liquid flowing in the first radiator 21 is higher than the temperature of the cooling liquid flowing in the second radiator 22. Therefore, the traveling wind which has flowed through the second heat exchanger 22*a* (see FIG. 2) of the second radiator 22 to be increased in temperature may cool the cooling liquid flowing in the first radiator 21. The traveling wind which has flowed through the second heat exchanger 22*a* (see FIG. 2) of the second radiator 22 and hit the first inlet tank 21*b* of the first radiator 21 flows to an outside through a gap between the first radiator 21 and the second radiator 22.

Figure 4:
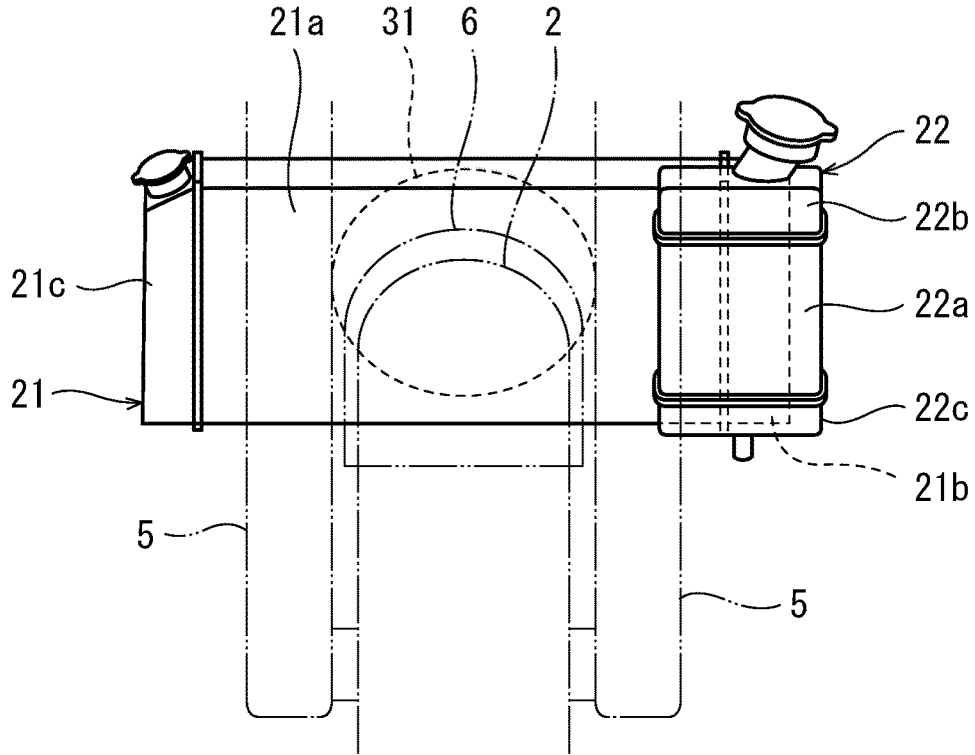
FIG. 4 is a front view when the first radiator and the second radiator shown in FIG. 1 are viewed from a vehicle front side.

FIG. 4 is a front view when the first radiator 21 and the second radiator 22 shown in FIG. 1 are viewed from the vehicle front side. Since the radiators 21 and 22 are inclined to the front side, upper end surfaces of the radiators 21 and 22 are shown in FIG. 4 when viewed from the vehicle front side. As shown in FIG. 4, the second radiator 22 partially overlaps the first radiator 21 when viewed from the vehicle front side. A left-right direction center of the second radiator 22 overlaps the first radiator 21 when viewed from the vehicle front side. Specifically, the left-right direction center of the second radiator 22 overlaps the first inlet tank 21*b* when viewed from the vehicle front side. The second heat exchanger 22*a* of the second radiator 22 overlaps the first heat exchanger 21*a* of the first radiator 21 when from the vehicle front side.

The first radiator 21 overlaps the front fork 5 when viewed from the vehicle front side. The first radiator 21 overlaps the front wheel 2 and the front fender 6 when viewed from the vehicle front side. The second radiator 22 is located outside the front wheel 2 and the front fender 6 in the left-right direction when viewed from the vehicle front side. The second radiator 22 is partially located outside the front forks 5 in the left-right direction when viewed from the vehicle front side. The second radiator 22 is entirely located outside the radiator fan 31 when viewed from the vehicle front side. The second radiator 22 overlaps the first inlet tank 21*b* when viewed from the vehicle front side.

Figure 5:
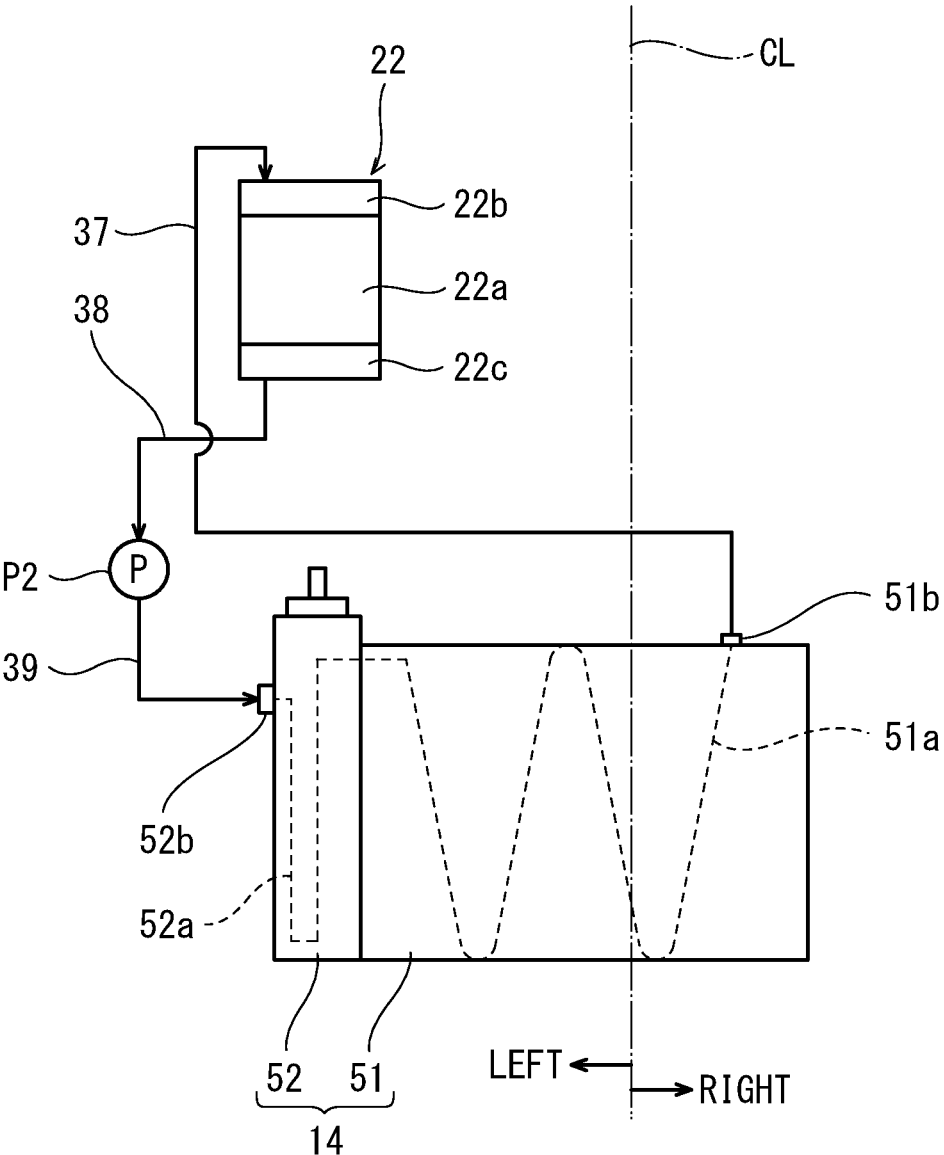
FIG. 5 is a schematic diagram of a cooling passage of the second radiator shown in FIG. 2.

FIG. 5 is a schematic diagram of a cooling passage of the second radiator 22 shown in FIG. 2. As shown in FIG. 5, the electric motor unit 14 includes an electric motor 51 and an inverter 52. In the present embodiment, the inverter 52 is integrated with the electric motor 51. A cooling target cooled by the second radiator 22 is a heat generating electric component that is driven by the electric motor unit 14 to generate heat. Specifically, cooling targets cooled by the second radiator 22 are the electric motor 51 and the inverter 52. The electric motor 51 generates driving power that drives the rear wheel 3. The inverter 52 controls electric power to be supplied to the electric motor 51.

The electric motor unit 14 is located at the left side of a vehicle center line CL that passes through the left-right direction center of the vehicle 1 and extends in the front-rear direction. In the present embodiment, the electric motor 51 is located on the vehicle center line CL such that a center of the electric motor 51 is located at the left side of the vehicle center line CL. The entire inverter 52 is located at the left side of the vehicle center line CL. The inverter 52 is adjacently located at the left side of the electric motor 51. The electric motor unit 14 and the second radiator 22 are located at one side of the vehicle center line CL in the left-right direction. Specifically, both the electric motor unit 14 and the second radiator 22 are located at the left side of the vehicle center line CL.

A portion of the second radiator 22 to which the second inlet tube 37 is connected is located at the left side of the left-right direction center of the second radiator 22. A portion of the second radiator 22 to which the second outlet tube 38 is connected is located at the left side of the left-right direction center of the second radiator 22. The portions of the second radiator 22 to which the tubes 37 and 38 are connected are located at a side of the vehicle center line CL which is the same as a side where the electric motor unit 14 is located.

The electric motor 51 includes a cooling passage 51*a* and an outflow port 51*b* communicating with the cooling passage 51*a*. The inverter 52 includes a cooling passage 52*a* and an inflow port 52*b* communicating with the cooling passage 52*a*. An outflow port of the cooling passage 52*a* is in connection with an inflow port of the cooling passage 51*a*. The inflow port 52*b* is located at a left portion of the inverter 52. The outflow port 51*b* is located at a right portion of the electric motor 51. A second relay tube 39 connects the second pump P2 to the inflow port 52*b* of the inverter 52.

The cooling liquid which has been cooled by the second radiator 22 flows through the second outlet tube 38, the second pump P2, and the second relay tube 39 in this order by the driving of the second pump P2 and flows into the inflow port 52*b* of the inverter 52. This cooling liquid flows through the cooling passage 52*a* and the cooling passage 51*a* in this order to cool the inverter 52 and the electric motor 51 and flows out from the outflow port 51*b* to the second inlet tube 37. This cooling liquid is cooled by the second radiator 22.

Figure 6:
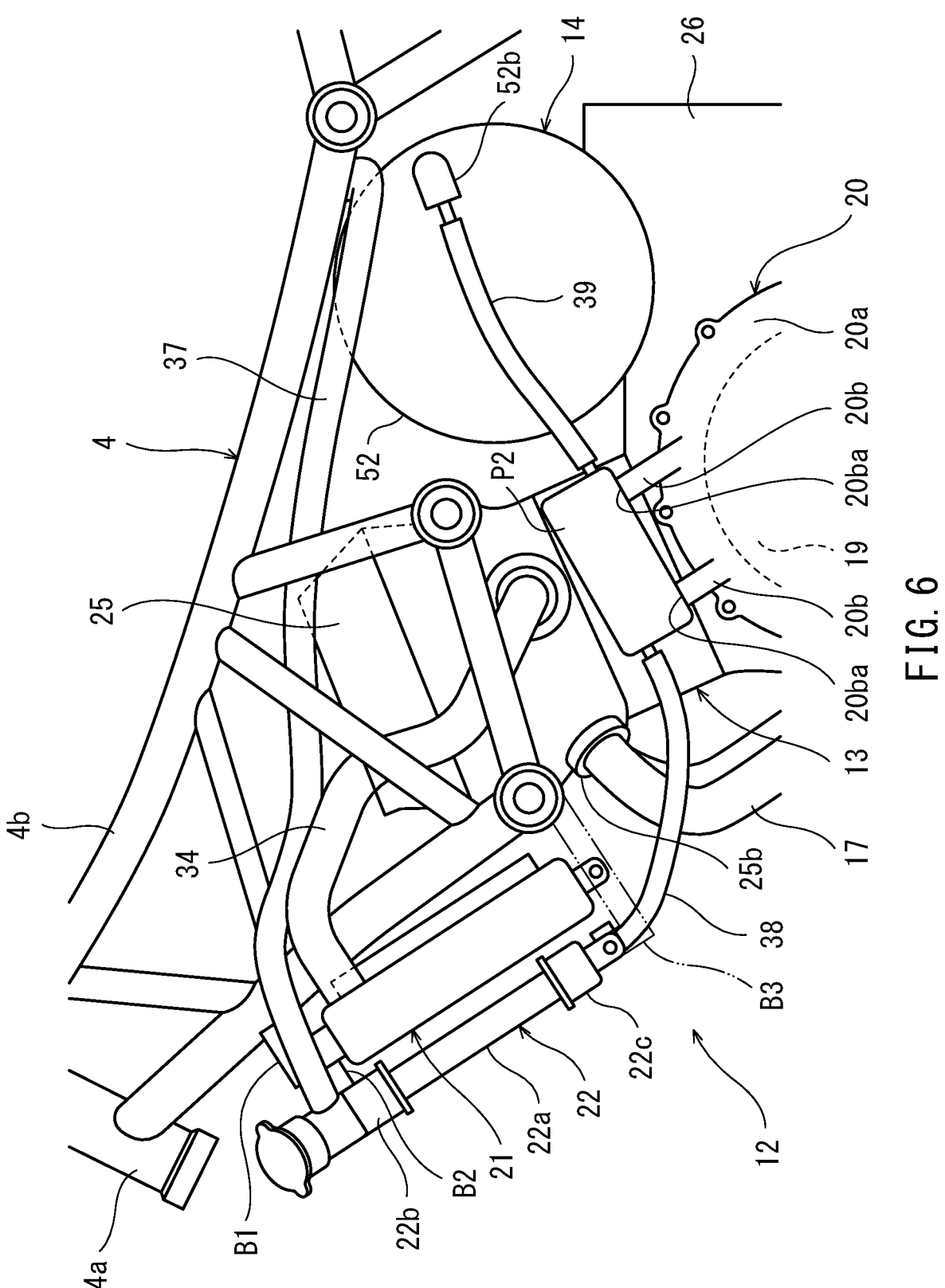
FIG. 6 is a left side view of the power unit, the first radiator, the second radiator, and their vicinities shown in FIG. 1.

FIG. 6 is a left side view of the power unit 12, the first radiator 21, the second radiator 22, and their vicinities shown in FIG. 1. As shown in FIG. 6, in a vehicle side view, the first radiator 21 is located along a frame portion of the vehicle body frame 4 which is located right behind and closest to the first radiator 21. Specifically, the frame portion which is located right behind and closest to the first radiator 21 is inclined so as to extend in the front direction and the upper direction, and the first radiator 21 is also inclined so as to extend in the front direction and the upper direction. The second radiator 22 is also inclined so as to extend in the front direction and the upper direction. The first radiator 21 and the second radiator 22 are inclined along a direction in which the cylinder 25 is inclined. In the vehicle side view, the second radiator 22 is parallel to the first radiator 21.

An upper portion of the first radiator 21 is fixed to the main frame 4*b* through a bracket B1 (also see FIG. 2). An upper portion of the second radiator 22 is fixed to the first radiator 21 through a bracket B2. A lower portion of the first radiator 21 and a lower portion of the second radiator 22 are fixed to the main frame 4*b* through a bracket B3.

The first inlet tube 34 connected to the first radiator 21 is in connection with a cooling passage outlet of a left side surface of the internal combustion engine 13. The cooling liquid from the first pump P1 is supplied to a cooling passage inlet of the internal combustion engine 13 (see FIG. 2).

The cover 20 includes: a cover main body 20*a* covering the starter generator 19; and pump supports 20*b* projecting from the cover main body 20*a*. The second pump P2 is fixed to the pump supports 20*b* of the cover 20 by fixtures. Specifically, each of the pump supports 20*b* projects upward from the cover main body 20*a* and includes an upper surface 20*ba*. The second pump P2 is mounted on the upper surfaces 20*ba* of the pump supports 20*b* from above.

In the vehicle side view, the second pump P2 is located so as to overlap the internal combustion engine 13. The second pump P2 is located between the second radiator 22 and the electric motor unit 14 in the front-rear direction. The second pump P2 is located lower than the second outlet tank 22*c* of the second radiator 22 and the inflow port 52*b* of the electric motor unit 14.

The second inlet tube 37 extends through above the first radiator 21 in the front-rear direction. The second inlet tube 37 is located at the left side of the vehicle center line CL (see FIG. 5) and extends in the front-rear direction from the rear side of the cylinder 25 to the front side of the cylinder 25. The second outlet tube 38 extends through under the first radiator 21 in the front-rear direction. In the vehicle side view, the second inlet tube 37 and the second outlet tube 38 do not overlap the first radiator 21 and are located away from the first radiator 21.

Figure 7:
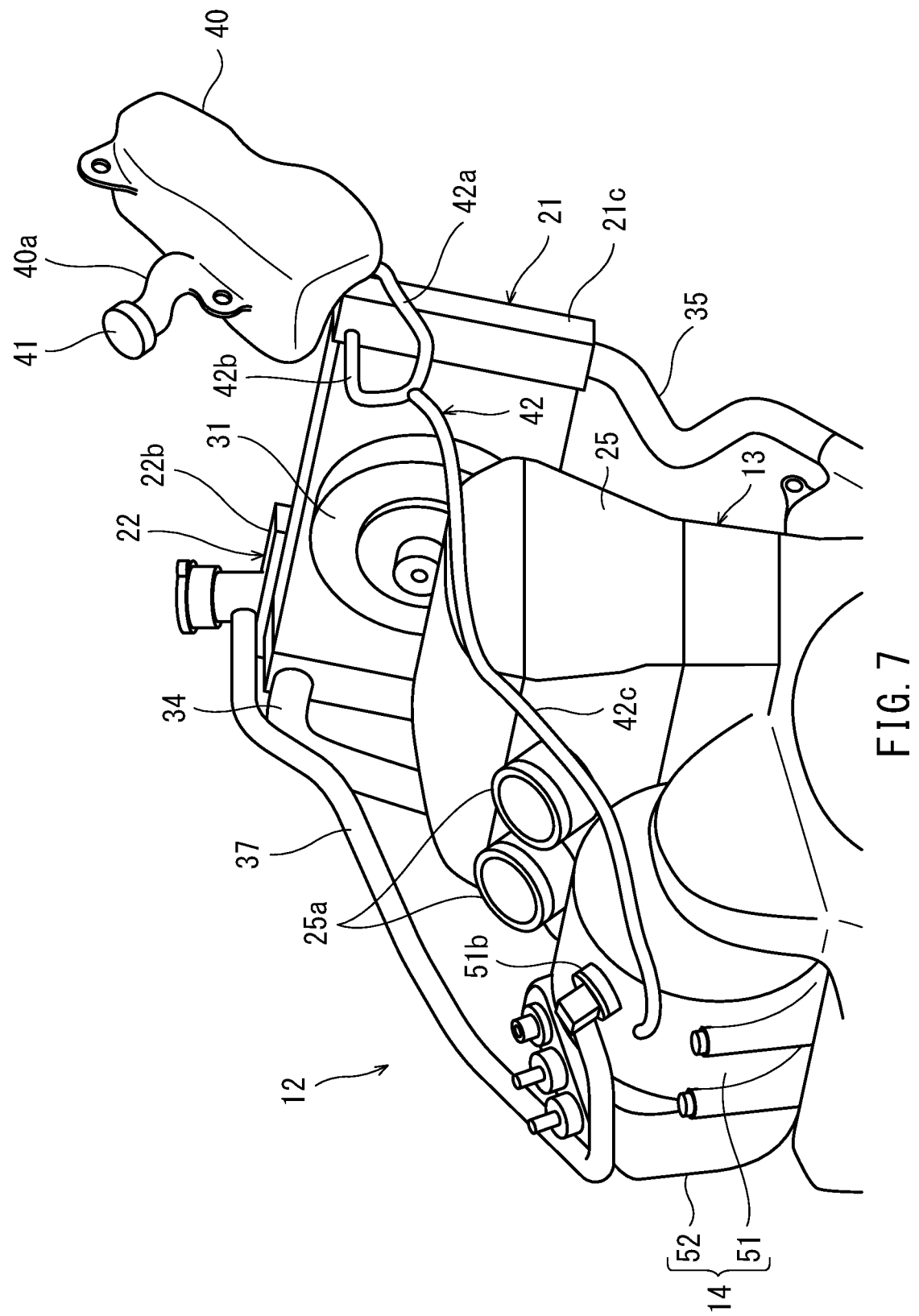
FIG. 7 is a perspective view when the power unit, the first radiator, the second radiator shown in FIG. 6 are viewed from a vehicle rear-right side.

FIG. 7 is a perspective view when the power unit 12, the first radiator 21, and the second radiator 22 shown in FIG. 6 are viewed from the vehicle rear-right side. As shown in FIG. 7, the vehicle 1 includes a common reservoir tank 40 for the first radiator 21 and the second radiator 22. The common reservoir tank 40 is supported by the vehicle body frame 4 (see FIG. 1). The common reservoir tank 40 achieves a function of housing the cooling liquid that has overflowed from the first radiator 21 or the second radiator 22 and a function of supplying the cooling liquid to the first radiator 21 or the second radiator 22. The cooling liquid of the first radiator 21 and the cooling liquid of the second radiator 22 are the same in type as each other.

The common reservoir tank 40 is located at a side of the first radiator 21 in the left-right direction which is opposite to a side at which the second radiator 22 is located. In the present embodiment, the second radiator 22 is located at the left side of the first radiator 21, and the common reservoir tank 40 is located at the right side of the first radiator 21.

The common reservoir tank 40 includes a liquid pouring port 40*a*. The liquid pouring port 40*a* is detachably closed by a reservoir cap 41. The common reservoir tank 40 is in connection with the first radiator 21 and the second radiator 22 through a common reservoir tube 42. The common reservoir tube 42 is located at the right side of the vehicle center line CL (see FIG. 5) and extends in the front-rear direction from the front side of the cylinder 25 to the rear side of the cylinder 25.

The common reservoir tube 42 includes a base line 42*a*, a first branch line 42*b*, and a second branch line 42*c*. The first branch line 42*b* and the second branch line 42*c* extend from the base line 42*a*. The base line 42*a* is in connection with the common reservoir tank 40. For example, the first branch line 42b connects the base line 42a to the first outlet tank 21c of the first radiator 21. For example, the second branch line 42c connects the base line 42a to the cooling passage 51a of the electric motor unit 14.

According to the above configuration, in the straddle vehicle 1 whose vehicle size is limited, the total occupied space occupied by the first radiator 21 and the second radiator 22 in the left-right direction can be reduced. A high-temperature cooling liquid flows through the first radiator 21 that cools the internal combustion engine 13 that is higher in temperature than the electric motor unit 14. Therefore, the traveling wind which has flowed through the second radiator 22 to be increased in temperature can be reused for the cooling of the first radiator 21. On this account, both the reduction of the occupied space and the improvement of the cooling efficiency can be achieved.

The second radiator 22 is located at one side of the left-right direction center of the first radiator 21 in the left-right direction. The left-right direction center of the second radiator 22 overlaps the first radiator 21 when viewed from the front side. According to this, while reducing the total occupied space occupied by the first radiator 21 and the second radiator 22 when viewed from the front side, the traveling wind is directly guided to the left-right direction center of the first radiator 21, and this can satisfactorily maintain the cooling efficiency of the first radiator 21.

In the present embodiment, the second radiator 22 overlaps a portion of the first radiator 21 which is closer to the first inlet tank 21b than to the first outlet tank 21c when viewed from the front side. With this, a temperature difference between the traveling wind having flowed through the second radiator 22 and a portion of the first radiator 21 through which the traveling wind flows becomes larger than that in a case where the second radiator 22 overlaps a portion of the first radiator 21 which is closer to the first outlet tank 21c than to the first inlet tank 21b when viewed from the front side. Therefore, the deterioration of the heat exchange performance of the first radiator 21 can be suppressed.

The entire second radiator 22 is located outside the front wheel 2 in the left-right direction when viewed from the front side. According to this, the traveling wind is easily and directly guided to the second radiator 22 without being blocked by the front wheel 2. Thus, the cooling efficiency of the second radiator 22 can be improved. In the present embodiment, the vehicle width direction center of the second radiator 22 is located outside the front fork 5 in the vehicle width direction. In other words, a vehicle width direction outer end of the second radiator 22 is located outside the front fork 5. With this, the traveling wind having been guided by the front fork 5 to an outside in the vehicle width direction is easily guided to the second radiator 22. Thus, the cooling efficiency can be further improved.

The lower end of the second radiator 22 is located higher than the lower end of the front fender 6. According to this, a possibility that a flying stone hits the second radiator 22 can be reduced.

The entire second radiator 22 is located outside the radiator fan 31 when viewed from the front side. According to this, the flow of the air flowing through the first radiator 21 can be satisfactorily generated by the radiator fan 31 without being blocked by the second radiator 22.

The second radiator 22 overlaps the first inlet tank 21b or the first outlet tank 21c when viewed from the front side. According to this, the area of a portion of the second radiator 22 which overlaps the first heat exchanger 21a when viewed from the front side can be reduced. Thus, the cooling efficiency of the first radiator 21 can be improved.

Each of the second inlet tube 37 and the second outlet tube 38 extends through above or under the first radiator 21 in the front-rear direction. According to this, the tubes 37 and 38 connected to the second radiator 22 can be located compactly. The tubes 37 and 38 connected to the second radiator 22 can be prevented from interfering with the route of the traveling wind flowing toward the first radiator 21.

The second pump P2 is fixed to the cover 20. According to this, a support to which the second pump P2 for the second radiator 22 is attached does not have to be at the internal combustion engine 13. Thus, the versatility of the internal combustion engine 13 can be improved.

The electric motor unit 14 and the second radiator 22 are located at one side of the left-right direction center of the vehicle 1 in the left-right direction. According to this, the tubes 37 to 39 through which the electric motor unit 14 and the second radiator 22 are connected to each other can be shortened. The first radiator 21 is located parallel to the second radiator 22. The first radiator 21 extends in the rear direction as it extends in the lower direction. With this, the first radiator 21 can be located at the front side as much as possible while being prevented from interfering with the front wheel 2 by steerage.

The exhaust pipe 17 extends toward one side of the left-right direction center of the vehicle 1 in the left-right direction, and the second radiator 22 is located at the other side of the left-right direction center of the vehicle 1 in the left-right direction. According to this, influence of the heat of the exhaust pipe 17 on the second radiator 22 can be reduced.

When a valve structure that applies power by which an intake valve or an exhaust valve is opened or closed is at the internal combustion engine 13, it is preferable that: the valve structure be located at one side of a vehicle body center in the left-right direction; and the second radiator 22 be located at the other side of the vehicle body center in the left-right direction. With this, a space behind the second radiator 22 can be easily made large, and the traveling wind having flowed through the second radiator 22 and the first radiator 21 can be easily guided to the rear side.

The second radiator 22 is located at the left side of the left-right direction center of the vehicle 1, i.e., the left side where the side stand 28 (see FIG. 1) exists. When the vehicle 1 is parked by using the side stand 28, i.e., the vehicle 1 is inclined toward the left side, the second radiator 22 is located lower than the center of the first radiator 21. With this, the heat of the first radiator 21 is prevented from being transferred to the second radiator 22.

In the present embodiment, the second pump P2 for the second radiator 22 is an electric pump. Therefore, even when the internal combustion engine 13 is in a stop state, the cooling effect can be obtained by circulating the cooling liquid in the second radiator 22. Moreover, the second pump P2 which circulates the cooling liquid in the second radiator 22 is included in addition to the first pump P1 which circulates the cooling liquid in the first radiator 21. With this, the cooling liquid in the second radiator 22 can circulate independently from the first radiator 21. Thus, the cooling performance of the second radiator 22 can be prevented from becoming excessive or becoming insufficient.

MODIFIED EXAMPLES

The vehicle 1 is a parallel hybrid vehicle but is not limited to this and may be a series hybrid vehicle. The driving power output from the electric motor 51 may be transmitted to the rear wheel 3 without through the transmission 15. The inverter 52 may be located away from the electric motor 51. A cooling target cooled by the second radiator 22 may be only one of the electric motor 51 and the inverter 52.

The second radiator 22 may entirely overlap the first radiator 21 when viewed from the vehicle front side. The left-right direction center of the second radiator 22 may overlap the first heat exchanger 21*a* of the first radiator 21 when viewed from the vehicle front side. The left-right direction center of the second radiator 22 does not have to overlap the first radiator 21 when viewed from the vehicle front side. The second radiator 22 may be entirely located outside the front fork 5 in the left-right direction when viewed from the vehicle front side. The second radiator 22 may overlap the front wheel 2 or the front fender 6 when viewed from the vehicle front side. The second radiator 22 may overlap the radiator fan 31 when viewed from the vehicle front side. The second radiator 22 may overlap the first heat exchanger 21*a* without overlapping the first inlet tank 21*b* and the first outlet tank 21*c* when viewed from the vehicle front side.

Only one of the second inlet tube 37 and the second outlet tube 38 may extend through above or under the first radiator 21 in the front-rear direction. The other of the second inlet tube 37 and the second outlet tube 38 may extend through a left-right direction outside of the first radiator 21 in the front-rear direction. Both the second inlet tube 37 and the second outlet tube 38 may extend through the left-right direction outside of the first radiator 21 in the front-rear direction. Another structure (for example, a traveling wind guide plate) may be located in a gap between the first radiator 21 and the second radiator 22.

The second pump P2 may be a mechanical pump instead of an electric pump. The second pump P2 may be a mechanical pump that mechanically operates in association with a driving shaft of the electric motor 51. Instead of the cover 20, the second pump P2 may be attached to another cover that covers a component of the internal combustion engine 13. For example, the second pump P2 may be detachably fixed to the cover 32 that covers the clutch connected to the crank shaft 27 of the internal combustion engine 13. The second pump P2 may be detachably fixed to a cylinder head cover.

The second pump P2 may be mounted on a surface other than an upper surface of the cover 20. The pump supports 20*b* of the cover 20 may project from the cover main body 20*a* in a direction different from the upper direction. The pump supports 20*b* may be seat surfaces that do not project from the cover main body 20*a*.

The electric motor unit 14 and the second radiator 22 may be located at the right side of the vehicle center line CL. In this case, the portions of the second radiator 22 to which the tubes 37 and 38 are connected may be located at the right side of the vehicle center line CL. The inverter 52 may be adjacently located at the right side of the electric motor 51.

A support structure for the first radiator 21 and the second radiator 22 is not limited to the above. The bracket B1 and the bracket B2 may be integrated with each other. The first radiator 21 and the second radiator 22 may be fixed to the vehicle body frame 4 by a single common bracket. The bracket B3 may be divided into plural brackets.

As described above, the embodiment has been described as an example of the technology disclosed in the present application. However, the technology in the present disclosure is not limited to this and is also applicable to embodiments in which modifications, replacements, additions, omissions, and the like are suitably made. Moreover, a new embodiment may be prepared by combining the components described in the above embodiment. For example, some of components or methods in one embodiment may be applied to another embodiment. Some components in an embodiment may be separated and arbitrarily extracted from the other components in the embodiment. Furthermore, the components shown in the attached drawings and the detailed explanations include not only components essential to solve the problems but also components for exemplifying the above technology and not essential to solve the problems.

What is claimed is:

1. A hybrid straddle vehicle comprising:

an internal combustion engine;

an electric motor that generates power to be transmitted to a driving wheel;

an inverter that controls electric power to be supplied to the electric motor;

a first radiator that cools the internal combustion engine; and a second radiator that cools at least one cooling target selected from the group consisting of the electric motor and the inverter, at least a part of the second radiator overlapping the first radiator when viewed from a vehicle front side, the second radiator being located in front of the first radiator in a front-rear direction of the hybrid straddle vehicle, wherein the second radiator is located at one side of a left-right direction center of the first radiator in a left-right direction.

2. The hybrid straddle vehicle according to claim 1, wherein:

a left-right direction center of the second radiator overlaps the first radiator when viewed from the vehicle front side.

3. The hybrid straddle vehicle according to claim 1, further comprising:

a radiator fan adjacent to the first radiator in the front-rear direction to generate a flow of air flowing through the first radiator, wherein the entire second radiator is located outside the radiator fan when viewed from the vehicle front side.

4. The hybrid straddle vehicle according to claim 1, wherein the first radiator includes:

a first heat exchanger, a first inlet tank located at one side of the first heat exchanger in a left-right direction and adjacent to the first heat exchanger, and a first outlet tank located at the other side of the first heat exchanger in the left-right direction and adjacent to the first heat exchanger; and the second radiator overlaps the first inlet tank or the first outlet tank when viewed from the vehicle front side.

5. The hybrid straddle vehicle according to claim 4, wherein the second radiator overlaps a portion of the first radiator which is closer to the first inlet tank than to the first outlet tank when viewed from a front side of the hybrid straddle vehicle.

6. The hybrid straddle vehicle according to claim 1, further comprising:

an inlet tube connected to the second radiator; and an outlet tube connected to the second radiator, wherein the second radiator includes:

a second heat exchanger, a second inlet tank located at one side of the second heat exchanger in an upper-lower direction and adjacent to the second heat exchanger, and a second outlet tank located at the other side of the second heat exchanger in the upper-lower direction and adjacent to the second heat exchanger;

the inlet tube is in connection with the second inlet tank;

the outlet tube is in connection with the second outlet tank; and at least one tube selected from the group consisting of the inlet tube and the outlet tube extends through above or under the first radiator in the front-rear direction.

7. The hybrid straddle vehicle according to claim 1, wherein one side of the left-right direction is a first side, and another side of the left-right direction is a second side, and a first end of the second radiator, which is on the first side of the second radiator, is located further in the left-right direction toward the first side relative to a first end of the first radiator, which is on the first side of the first radiator.

8. The hybrid straddle vehicle according to claim 1, wherein a heat exchanger of the second radiator is located in front of and away from a tank of the first radiator.

9. The hybrid straddle vehicle according to claim 1, wherein the first radiator is directed such that a dimension of the first radiator in a left-right direction of the first radiator is larger than a dimension of the first radiator in an upper-lower direction of the first radiator, and the second radiator is directed such that a dimension of the second radiator in an upper-lower direction of the second radiator is larger than a dimension of the second radiator in a left-right direction of the second radiator.

10. A hybrid straddle vehicle comprising:

an internal combustion engine;

an electric motor that generates power to be transmitted to a driving wheel;

an inverter that controls electric power to be supplied to the electric motor;

a first radiator that cools the internal combustion engine;

a second radiator that cools at least one cooling target selected from the group consisting of the electric motor and the inverter, at least a part of the second radiator overlapping the first radiator when viewed from a vehicle front side, the second radiator being located in front of the first radiator in a front-rear direction of the hybrid straddle vehicle; and a front fender located in front of the first radiator and the second radiator, wherein a lower end of the second radiator is located higher than a lower end of the front fender.

11. A hybrid straddle vehicle comprising:

an internal combustion engine;

an electric motor that generates power to be transmitted to a driving wheel;

an inverter that controls electric power to be supplied to the electric motor;

a first radiator that cools the internal combustion engine;

a second radiator that cools at least one cooling target selected from the group consisting of the electric motor and the inverter, at least a part of the second radiator overlapping the first radiator when viewed from a vehicle front side, the second radiator being located in front of the first radiator in a front-rear direction of the hybrid straddle vehicle;

a cover that covers a component of the internal combustion engine and is detachable; and a pump that generates a flow of a cooling liquid between the second radiator and the cooling target, wherein the pump is fixed to the cover.

12. A hybrid straddle vehicle comprising:

an internal combustion engine;

an electric motor that generates power to be transmitted to a driving wheel;

an inverter that controls electric power to be supplied to the electric motor;

a first radiator that cools the internal combustion engine; and a second radiator that cools at least one cooling target selected from the group consisting of the electric motor and the inverter, at least a part of the second radiator overlapping the first radiator when viewed from a vehicle front side, the second radiator being located in front of the first radiator, wherein the second radiator is located at one side of a vehicle center line.

13. The hybrid straddle vehicle according to claim 12, further comprising:

a front wheel located in front of the first radiator and the second radiator, wherein the entire second radiator is located outside the front wheel in a left-right direction when viewed from the vehicle front side.

14. The hybrid straddle vehicle according to claim 12, wherein the cooling target and the second radiator are located at one side of a vehicle width direction center of the straddle vehicle in a vehicle width direction.

15. The hybrid straddle vehicle according to claim 12, further comprising:

an exhaust pipe by which an exhaust gas of the internal combustion engine is guided, wherein the exhaust pipe extends toward one side of a vehicle width direction center of the straddle vehicle in a vehicle width direction; and the second radiator is located at the other side of the vehicle width direction center of the straddle vehicle in the vehicle width direction.

16. The hybrid straddle vehicle according to claim 12, further comprising:

a side stand located at one side of a left-right direction of the hybrid straddle vehicle, wherein the second radiator is located at the one side of the left-right direction relative to a left-right direction center of the hybrid straddle vehicle.

* * * * *